United States Patent [19]

Handke et al.

[11] Patent Number: 5,402,868
[45] Date of Patent: Apr. 4, 1995

[54] CONTAINER PISTON DEVICE

[75] Inventors: Günther Handke, Euerbach, Germany; Michael Schupp; David M. Miller, both of Troy, Mich.

[73] Assignee: Fichtel & Sachs AG, Schweinfurt, Germany

[21] Appl. No.: 981,882

[22] Filed: Nov. 25, 1992

[30] Foreign Application Priority Data

Nov. 28, 1991 [DE] Germany .................. 41 39 131.4

[51] Int. Cl.6 .................. B60G 13/00; F16F 9/38
[52] U.S. Cl. .................. 188/322.12; 267/122; 267/64.27
[58] Field of Search .................. 188/322.12, 321.11, 188/322.11, 322.16, 322.17; 277/212 FB, 212 R; 280/708, 711, 668, 712, 710; 267/64.11, 122, 221, 33, 34, 35, 64.15, 64.19, 64.23, 64.27

[56] References Cited

U.S. PATENT DOCUMENTS

| | | | |
|---|---|---|---|
| 4,114,460 | 9/1978 | Oto | 188/322.12 |
| 4,235,426 | 11/1980 | Sullivan, Jr. et al. | 188/322.12 |
| 4,249,645 | 2/1981 | Level et al. | 188/322.12 |
| 4,372,429 | 2/1983 | Marx . | |
| 4,392,638 | 7/1983 | Kato et al. | 188/322.12 |
| 4,529,213 | 7/1985 | Goodman | 188/322.12 |
| 4,969,542 | 11/1990 | Athmer et al. | 188/322.12 |

FOREIGN PATENT DOCUMENTS

| | | | |
|---|---|---|---|
| 2660719 | 10/1991 | France | 188/322.12 |
| 9109020.2 | 10/1991 | Germany . | |
| 3-84236 | 4/1991 | Japan | 188/322.12 |

*Primary Examiner*—Douglas C. Butler
*Attorney, Agent, or Firm*—Brumbaugh, Graves, Donohue & Raymond

[57] ABSTRACT

According to an illustrative example of the invention, a suspension strut of a motor vehicle comprises a protective bellows for the piston rod. This protective bellows protects the piston rod in all positions of the piston rod between an axially innermost operational position and an axially outermost operational position. When the piston rod approaches its axially outermost operational position, the folding bellows is elongated. When the piston rod approaches its axially innermost position, substantially no compression of the folding bellows occurs.

27 Claims, 3 Drawing Sheets

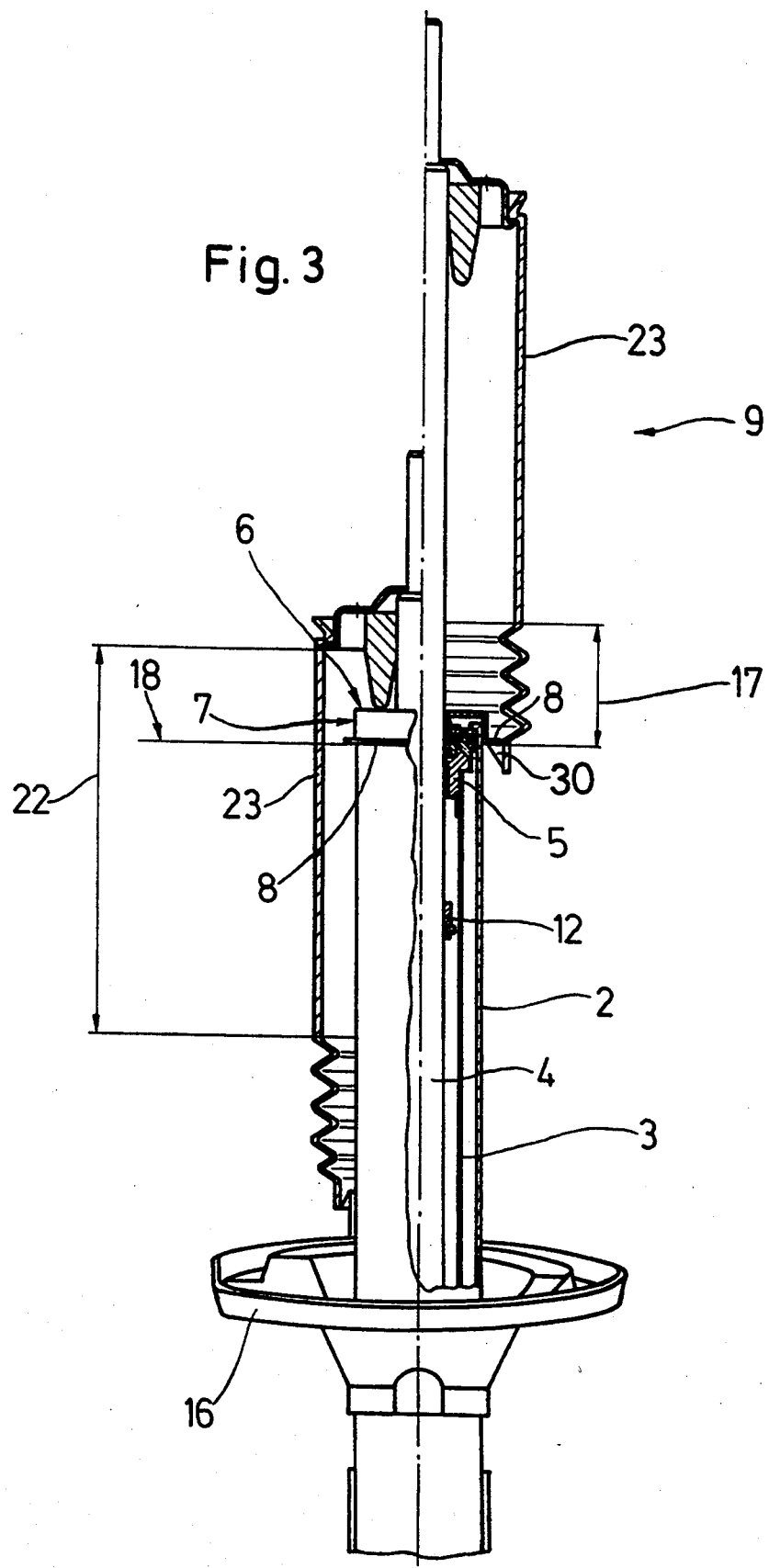

CONTAINER PISTON DEVICE

BACKGROUND OF THE INVENTION

This invention relates to a cylinder piston device such as a vibration damper to be used in motor vehicle wheel suspensions.

Many measures have been adopted to protect the piston rod of a vibration damper on a motor vehicle. Protective devices having a protective tube as main component are known in addition to a corrosion-proofing treatment of the piston rod, usually in the form of chromium plating. The protective tube is generally connected directly or indirectly to the piston rod so that the two parts move synchronously.

With telescopic legs or suspension struts, however, the problem arises that the shortening path and therefore the entry section of the piston rod is longer than the maximum possible overlap between the cylindrical tube and the protective device for the piston rod. As known, protective bellows are used in such cases, which are capable of elastically deforming if they come into contact, for example with a spring support plate.

OLDER DEVELOPMENTS

A protective device consisting of an elastic protective bellows in conjunction with a cylindrical tube end cap is proposed in German Utility Model G 91 09 020 of the present assignee, which was published on Nov. 28, 1991. The cylindrical tube end cap comprises a contact face for an additional spring as well as a carrier portion with a protective bellows holding element. During a spring movement of the motor vehicle wheel, the protective bellows has to compensate for any change of length of the vibration damper. Although the version according to FIG. 4 allows a certain lengthening of the vibration damper without bellows movement, it can be said that the change of length of the bellows generally corresponds to the wheel movement.

The permanent stressing by the change of length of the protective bellows obviously adversely affects the service life of the protective device. High-quality materials have to be used for compensation.

OBJECT OF THE INVENTION

An object of the present invention is to provide a protective device for a vibration damper, in particular for the piston rod, which is constructed such that the protective device is exposed to a minimum of stress during operation of the damper, offers reliable protection in conjunction with a reduction in costs and is easy to install.

SUMMARY OF THE INVENTION

A container piston device comprises a container member having an axis and two ends and further comprises a piston rod member axially guided by guiding and sealing means through at least one of the two ends. The piston rod member is movable between an axially innermost operational position in which a minimum portion of the piston rod member extends beyond the one end and an axially outermost operational position in which a maximum portion of the piston rod member extends beyond the one end of said container member. The container piston device further comprises an annular protection member. This annular protection member has a first end portion fastened for common axial movement to the piston rod member adjacent an outer end section of the piston rod member and a second end portion axially movable with respect to the container member along an external circumferential surface thereof. The second end portion of said annular protection member is axially movable with respect to the container member without substantial variation of the axial length of the annular protection member during an axial movement of the piston rod member with respect to the container member between the axially innermost operational position and a predetermined axially intermediate position. Protection member abutment means are provided in operationally fixed axial position with respect to the one end of the container member. The second end portion of the protection member is provided with protection member counter-abutment means engageable with the protection member abutment means, when the piston rod member during an outward movement with respect to the container member reaches the axially intermediate position. The protection member is capable of elastic elongation during a further outward movement of the piston rod member with respect to the container member beyond the predetermined axially intermediate position towards the axially outermost operational position.

The advantage of the design according to the present invention is that the protection member is stressed only over a small range of movement of the respective spring-supported wheel. It is to be noted that this small range of movement is adjacent the maximum length of the container piston device. As this position of maximum length is reached only in extreme situations, the frequency of elongation of the protection member is low. Therefore, the service life of the cylinder piston device is increased or, considered the other way round, the requirements on the material to be used may be reduced with the same service life. It is further to be noted that according to the present invention, substantially no compressive forces are transmitted to the annular protection member even in the axially innermost operational position of the piston rod member. Nevertheless, it is possible to permit a stroke of the piston rod member larger than the maximum overlapping length of the annular protection member and the container member without exposing the piston rod member at any time to the free atmosphere such that the piston rod member is always protected even in its axially outermost operational position. It is preferred to make the path of movement of the second end portion of the protection member along the container member as large as possible in order to reduce the elastic elongation of the protection member. The difference between the stroke of the piston rod member and the possible path of movement of the second end portion of the protection member is, however, dependent on the overall design of a suspension strut and, therefore, it is sometimes necessary to provide a considerable elongation. This considerable elongation is, however, much more acceptable than a considerable compression, because even a considerable elongation does not result in radial deflection of the protection member.

The protection member and more particularly the second end portion thereof is preferably dimensioned in diameter such that minimum frictional contact, if any, occurs between the protection member and the container member.

In general practice, the predetermined axially intermediate position of the piston rod member is nearer to the axially outermost operational position than to the axially innermost position. E.g. the axial distance of the axially intermediate position from the axially outermost operational position is less than one half or even less than one third of the axial distance between the axially intermediate position and the axially innermost operational position. Accordingly, the elongation is relatively small.

The container member may be provided with radially projecting constructional means adjacent a second end thereof remote from the first end. In such case, the second end portion of the annular protection member should remain out of contact with these constructional means, when the piston rod member is positioned in the axially innermost operational position in order to avoid compression forces onto the annular protection member.

While the innermost operational position and the outermost operational position of the piston rod member could also be defined by the overall construction of a motor vehicle wheel suspension, it is possible that at least one of the axially innermost operational position and the axially outermost operational position of the piston rod member with respect to the container member are defined by respective terminal abutment means provided on the container member and the piston rod member.

An auxiliary spring device may be provided, e.g. elastic buffer abutment means which provide a spring action, when the piston rod member approaches the axially innermost operational position. Such elastic buffer abutment means may comprise a cover member of the container member adjacent the first end thereof and an elastic buffer member provided on the piston rod member adjacent the outer end section thereof.

The protection member abutment means may be provided on a cover member covering the first end of the container member. This cover member may comprise a cover plate substantially orthogonal with respect to the axis and a sleeve member surrounding the external circumferential surface of the container member. In such case, the protection member abutment means may be provided by radial projection means of the cover member and more particularly of the sleeve member thereof. These radial projection means may be shaped as a radially outward projecting annular flange member.

In many cases it will not be necessary to provide the annular protection member with a high degree of elastic stretchability along its total length. It is rather possible that the annular protection member has a first axial section of higher elastic stretchability and a second axial section of smaller elastic stretchability. Thus, the overall form stability of the annular protection member may be increased. The first axial section of higher elastic stretchability may e.g. be a bellows-shaped section. As the bellows-shaping is rather expensive, it is desirable to reduce the bellows-shaping in accordance with the elongation length required. The sections of high and less stretchability may be integrally formed or composed of separately manufactured items.

In case of a bellows-shaped section of the protection member, the length and wave shape of the bellows section should be such as to at least fully allow the elongation required.

The annular protection member may be made of plastics materials or elastomeric materials, such as rubber.

The protection member counter-abutment means of the annular protection member may be integrally shaped with the annular protection member. E.g., the protection member counter-abutment means may comprise a counter-abutment face or faces axially directed in the direction of axially outward movement of the piston rod member with respect to the container member. According to a preferred embodiment, the protection member counter-abutment means are provided by radially inwards directed cams of the annular protection member. These cams may be substantially uniformly distributed along a periphery of the annular protection member.

For facilitating the assembling of the container piston device, the protection member counter-abutment means may be provided with chamfered slip-over surface means such that one can easily push the protection member counter-abutment means across the protection member abutment means of the container member, until the protection member counter-abutment means snap behind the protection member abutment means. This snapping operation may be accompanied by a circumferential extension of the second end portion of the protection member. This circumferential extension may be facilitated by the weakened portions between subsequent cams.

The protection member counter-abutment means may provide air flow passages between an internal space confined by the annular protection member and atmosphere. These air flow passages may be provided by the interspaces between subsequent cams. Such a pressure balance is possible, when the volume within the protection member is varied during axial movement of the piston rod member.

The annular protection member may be fastened to the piston rod member adjacent the outer end section of the piston rod member by a carrier element. This carrier element may simultaneously be also the carrier of an elastic buffer. The carrier may be fixed to the piston rod member at a shoulder face thereof separating the full diameter section of the piston rod member from a fastening pin of the piston rod member by which the piston rod member is connected to a motor vehicle body.

While the invention is also applicable to other hydraulic and pneumatic devices such as gas springs or hydraulic or pneumatic length adjustment devices, a preferred field of application of the invention are vibration dampers having a damping piston mounted on the piston rod member within a cylindrical tube member and separating two working spaces from each other within the cylindrical tube member.

The most preferred field of application of the inventive principles are suspension struts of a motor vehicle wheel suspension, which suspension struts have a spring support member for a helical compression spring. This spring support member is fastened to the container member. This spring support is frequently the reason why the inventive principle should be applied in order to allow a full protection of the piston rod member without axial compression of the protection member irrespective of the fact that the axial stroke of the piston rod member is larger than the maximum overlapping length of the protection member and the container member.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to the embodiments shown in the accompanying drawings in which.

DETAILED DESCRIPTION OF THE PREFERRED EMBODIMENTS

Figure 1:
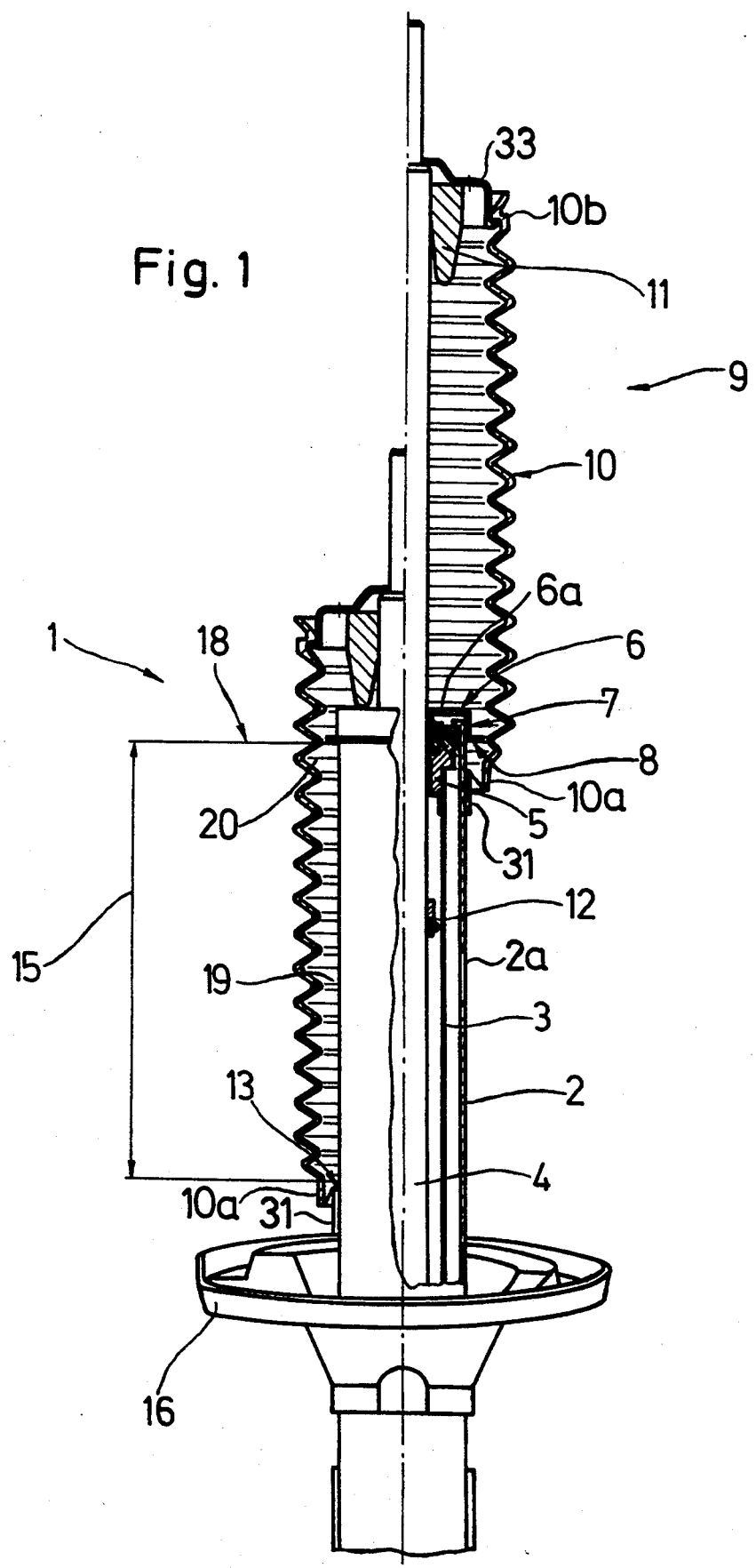
FIG. 1 shows a vibration damper that is part of a suspension strut and constitutes a first embodiment of an annular protection member.

The vibration damper 1 shown in FIG. 1 is a part of a suspension strut and consists essentially of a cylindrical tube 2, a pressure tube 3 positioned axially with respect to the cylindrical tube 2 and a piston rod 4 of which a damping piston divides the pressure tube 3 into two working chambers. With a vibration damper of the single tube type, pressure tube and cylindrical tube are identical components. A piston rod seal and guide unit 5 seals the vibration damper 1 from the atmosphere. An end cap 6 consisting of an end plate 6a and a sleeve-shaped wall 7 is provided with a protective bellows abutment disc 8 and is fastened by the wall 7 to the cylindrical tube 2. A folding bellows 10 is installed as a protective device 9 for the piston rod 4 and is fastened directly or indirectly to the piston rod 4. The lower end of the folding bellows 10 can move without any length variation on inward and outward movement of the piston rod 4 as long as the lower end portion 10a of the folding bellows 10 remains out of contact with the abutment disc 8. Inside the folding bellows 10, an elastic buffer 11 fixed to the piston rod 4 acts as an additional spring.

Figure 2:
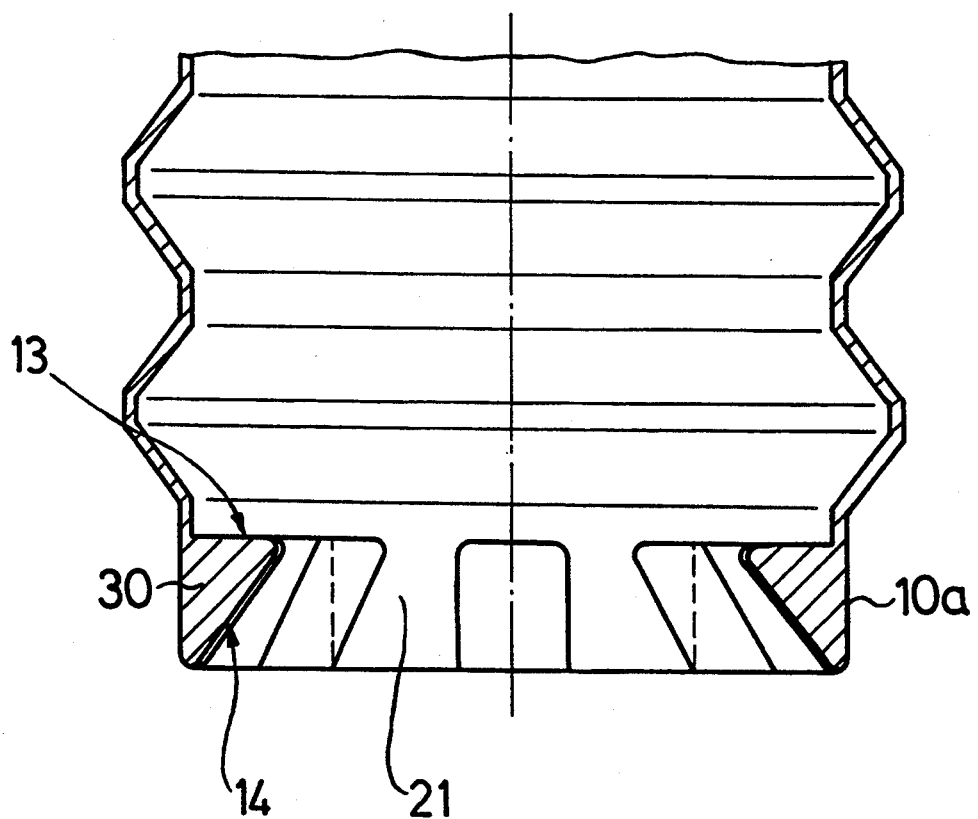
FIG. 2 shows an end portion of a bellows-shaped protection member as shown in FIG. 1 and FIG. 3 a modified embodiment of a bellows-shaped protection member.

The left-hand half of the drawing shows the condition of a completely retracted wheel (wheel not shown), whereas the right-hand half shows a largely extended piston rod 4. A stop 12 which comes to rest on the piston rod seal and guide unit 5 and the buffer 11 which comes to rest on the cap 6 define the maximum spring path of the vehicle wheel in terms of operation. FIG. 2 shows the lower end of the folding bellows 10. Horizontal abutment faces 13 and installation ramps 14 are provided by circumferentially distributed cams 30. On outward movement of the piston rod 4 with respect to the cylindrical tube 2, the abutment faces 13 abut the abutment disc 8 before the piston rod 4 reaches its outermost axial position, which may be defined by axial abutment of the stop 12 on the piston rod seal and guide unit 5. The position of the piston rod 4 with respect to the cylindrical tube 2 in which the abutment faces 13 start to engage the abutment disc 8 is nominated as a predetermined axially intermediate position. The position of the piston rod 4, in which the elastic buffer 11 engages the end plate 6a of the cap 6 is nominated as the axially innermost operational position. The axially outermost operational position occurs when the stop 12 engages the seal and guide unit 5. When the piston rod 4 is in its axially innermost position as shown in the left-hand side of FIG. 1, the lower end portion 10a of the folding bellows 10 is still spaced from a spring support 16 fastened to the cylindrical tube 2. The spring support 16 is intended for supporting an axial compression spring having its upper end in supporting engagement with a further spring support mounted on the body of the vehicle. It is to be noted that the folding bellows 10 is not axially compressed but has its full unloaded length, when the piston rod 4 is in its axially innermost position. On upward movement of the piston rod 4 from its axially innermost operational position as shown in the left-hand side of FIG. 1, the cams 30 engage by their abutment faces 13 the abutment disc 8. Until engagement of the cams 30 with the abutment disc 8 the lower end portion 10a of the folding bellows 10 slides substantially without friction along the external circumferential face 3a of the cylindrical tube 2 substantially without length variation of the folding bellows 10. When the cams 30 have engaged the abutment disc 8, i.e. when the piston rod 4 has reached its predetermined intermediate position and when the piston rod 4 is thereafter moved further outwards with respect to the cylindrical tube 2 towards its axially outermost operational position defined by engagement of the stop 12 with the piston rod seal and guide unit 5, the folding bellows 10 is elastically elongated. When the piston rod 4 thereafter moves inwards again towards the predetermined axially intermediate position, the folding bellows 10 elastically contracts again. When the piston rod 4 is thereafter further moved inwards with respect to the cylindrical tube 2, the cams 30 are separated again from engagement with the abutment disc 8 and the lower end portion 10a of the folding bellows 10 travels downwards again along the circumferential face 3a without length variation of the folding bellows until the piston rod 4 has reached its innermost position as shown in the lefthand side of FIG. 1.

In FIG. 1, the overlapping length of the cylindrical tube 2 and the folding bellows 10 has been designated by 15 with 18 being a reference level, this reference level being defined by the abutment disc 8. It is to be noted that this overlapping length 15 is smaller than the total possible stroke of the piston rod 4 with respect to the cylindrical tube 2. Nevertheless, the total free length of the piston rod 4 is always covered by the folding bellows 10 thanks to the cooperation of cams 30 and abutment disc 8, which prevents the lower end portion 10a of the folding bellows 10 to move beyond the position as defined by the abutment disc 8.

The folding bellows 10 is exclusively subject to elongation forces and never to compression forces. The cap 6 is preferably produced as a sheet metal part, as the axial length of the sleeve-shaped wall 7 can be made shorter owing to the higher permitted surface pressure between the sleeve-shaped wall 7 and the cylindrical tube 2 as compared with a plastics component. This contributes to a reduction of the elongation of the folding bellows 10. A gap 20 permits ventilation of the space 19 within the folding bellows 10. When the cams 30 come into contact with the abutment disc 8, further ventilation is possible through the interspaces 21 between adjacent cams 30.

A guiding sleeve 31 may be connected with the lower end portion 10a of the folding bellows 10 for substantially frictionless guiding of the lower end portion 10a on the external surface 2a. It should be noted, however, that both the lower end portion 10a and the surface 2a should not be subject to wear. Accordingly, low friction material should be used for the sliding engagement faces of the lower end portion 10a and the circumferential surface 3a. This makes also sure that no unintended length variations of the folding bellows 10 occur as long as the cams 30 are located below the abutment disc 8.

In the embodiment of FIG. 3, the folding bellows 10 is replaced by a protection member having a lower section 17 and an upper section 23. The lower section 17 is bellows-shaped. The length of this lower section 17 is dimensioned such that it is sufficient for permitting the elongation of the protection member after the cams 30 have engaged the abutment disc 8. The protection member of FIG. 3 may be less expensive, because the shaping of the bellows profile is expensive. The section 23 may be substantially rigid. Such, the stability of the protection member is also increased. The service life may also be increased.

It is easily understandable that the devices of both FIG. 1 and FIG. 3 can be easily assembled in usual way. The lower end portion 10a of the bellows 10 and 17, respectively, may be snapped across the abutment disc 8 at the end of the assembling operation. It is possible also to provide a snapping engagement between the upper end portion 10b of the folding bellows 10 and the carrier 33 fastened to the upper end of the piston rod 4.

While specific embodiments of the invention have been shown and described in detail to illustrate the application of the inventive principles, it will be understood that the invention may be embodied otherwise without departing from such principles.

We claim:

1. A container/piston rod device comprising a container member having an axis and two ends, a piston rod member axially guided by guiding and sealing means through at least one of said two ends, said piston rod member being movable between an axially innermost operational position in which a minimum portion of said piston rod member extends beyond said one end and an axially outermost operational position in which a maximum portion of said piston rod member extends beyond said one end of said container member, an annular protection member having a first end portion fastened for common axial movement to said piston rod member adjacent an outer end section of said piston rod member and a second end portion axially movable with respect to said container member along an external circumferential surface thereof, said second end portion of said annular protection member being axially movable with respect to said container member without substantial variation of the axial length of said annular protection member during at least a part of an axial movement of said piston rod member with respect to said container member between said axially innermost operational position and a predetermined axially intermediate position, which part of said axial movement extends from said predetermined axially intermediate position toward said axially innermost operational position, protection member abutment means in operationally fixed axial position with respect to said one end of said container member, and protection member counter-abutment means on said second end portion of said protective member engageable with said protection member abutment means when said piston rod member during an outward movement with respect to said container member reaches said axially intermediate position, said protection member being subjected to a pulling force providing an elastic elongation of said protection member during a further outward movement of said piston rod member with respect to said container member beyond said predetermined axially intermediate position towards said axially outermost operational position.

2. A container/piston rod device as set forth in claim 1, wherein said predetermined axially intermediate position of said piston rod member is nearer to said axially outermost operational position than to said axially innermost position.

3. A container/piston rod device as set forth in claim 2, wherein the axial distance of said axially intermediate position from said axially outermost operational position is less than one half of the axial distance between said axially intermediate position and said axially innermost operational position.

4. A container/piston rod device as set forth in claim 3, wherein the axial distance between said axially intermediate position and said axially outermost operational position is smaller than one third of the axial distance between said axially intermediate position and said axially innermost operational position.

5. A container/piston rod device as set forth in claim 1, wherein said container member has radially projecting constructional means adjacent a second end thereof remote from said first end, said second end portion of said annular protection member being spaced apart from said constructional means, when said piston rod member is positioned in said axial innermost operational position.

6. A container/piston rod device as set forth in claim 1, wherein at least one of said axially innermost operational position and said axially outermost operational position of said piston rod member with respect to said container member is defined by respective terminal abutment means provided on said container member and said piston rod member.

7. A container/piston rod device as set forth in claim 1, and further comprising elastic buffer abutment means on said piston rod member and said container member, said elastic buffer abutment means providing elastic energy absorption when said piston rod member approaches said axially innermost operational position.

8. A container/piston rod device as set forth in claim 7, wherein said elastic buffer abutment means includes a cover member of said container member adjacent said first end thereof and an elastic buffer member provided on said piston rod member adjacent said outer end section thereof.

9. A container/piston rod device as set forth in claim 1, wherein said protection member abutment means is provided on a cover member covering said first end of said container member.

10. A container/piston rod device as set forth in claim 9, wherein said cover member includes a cover plate substantially orthogonal with respect to said axis and a sleeve member surrounding said external circumferential surface of said container member, said protection member abutment means being provided by radial projection means of said cover member.

11. A container/piston rod device as set forth in claim 10, wherein said radial projection means is shaped as a radially outward projecting annular flange member.

12. A container/piston rod device as set forth in claim 1, wherein said annular protection member has a first axial section of higher elastic stretchability and a second axial section of smaller elastic stretchability.

13. A container/piston rod device as set forth in claim 12, wherein said second axial section of smaller elastic stretchability is located adjacent said outer end section of said piston rod member.

14. A container/piston rod device as set forth in claim 12, wherein said first axial section of higher elastic stretchability is a bellows-shaped section.

15. A container/piston rod device as set forth in claim 12, wherein said second axial section is longer than said first axial section.

16. A container/piston rod device as set forth in claim 12, wherein the stretchability of said first section of higher stretchability permits substantially axially outwardly directed movement of said piston rod member from said axially intermediate position towards said axially outermost operational position, said first section of higher stretchability being elongated during said movement by an elongation length corresponding to the axial distance between said axially intermediate position and said axially outermost operational position.

17. A container/piston rod device as set forth in claim 1, wherein said annular protection member is made of an elastomeric material.

18. A container/piston rod device as set forth in claim 1, wherein said protection member counter-abutment means of said annular protection member is integral and unitary with said annular protection member.

19. A container/piston rod device as set forth in claim 1, wherein said protection member counter-abutment means includes a counter-abutment face facing in the direction of axially outward movement of said piston rod member with respect to said container member.

20. A container/piston rod device as set forth in claim 1, wherein said protection member counter-abutment means includes radially inwards directed cams of said annular protection member, said cams being substantially uniformly spaced apart along the periphery of said annular protection member.

21. A container/piston rod device as set forth in claim 1, wherein said protection member counter-abutment means is provided with chamfered slip-over surface means.

22. A container/piston rod device as set forth in claim 1, wherein said protection member counter-abutment means includes air flow passage means between an internal space confined by said annular protection member and atmosphere.

23. A container/piston rod device as set forth in claim 1, wherein said annular protection member is fastened to said piston rod member adjacent said outer end section of said piston rod member by a carrier element.

24. A container piston rod device as set forth in claim 1, wherein said annular protection member is at least partially shaped as a folding bellows.

25. A container/piston rod device as set forth in claim 1, wherein said container/piston rod device is a vibration damper having a damping piston mounted on said piston rod member within a cylindrical tube member and separating two working spaces from each other within said cylindrical tube member.

26. A container/piston rod device as set forth in claim 25, wherein said vibration damper is part of a suspension strut of a motor vehicle wheel suspension, said suspension strut including a spring support member for a helical compression spring, said spring support member being fixed with respect to said container member.

27. A container/piston rod device as set forth in claim 17, wherein said protection member is made of a rubber.

* * * * *